Figure 1:
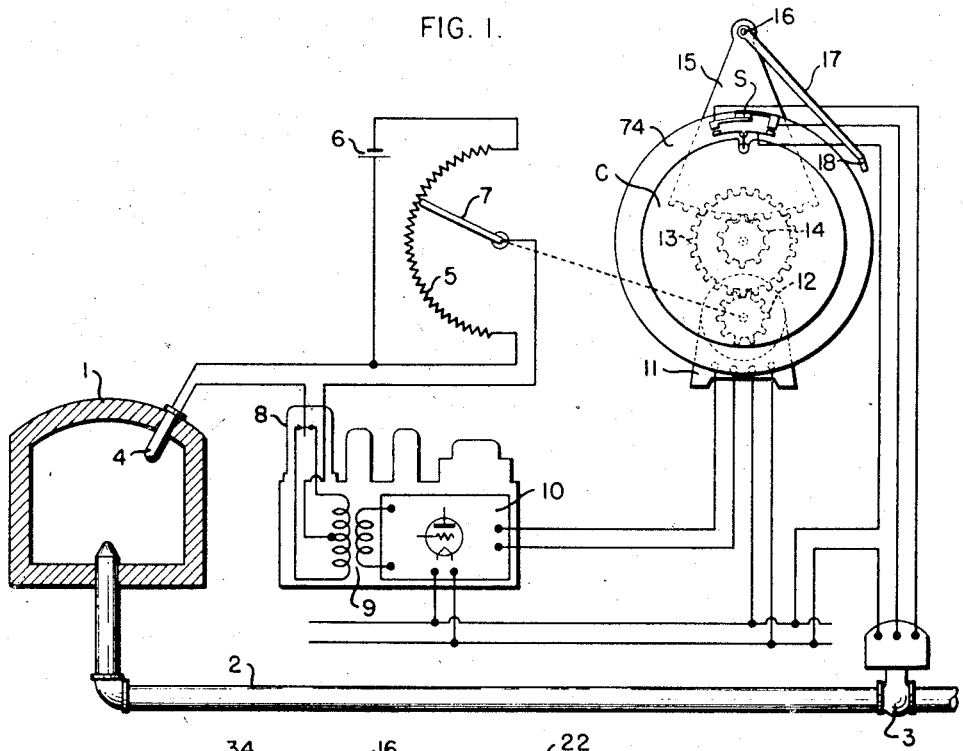

Feb. 3, 1948. A. H. JORDAN 2,435,281
CONTROL INSTRUMENT
Filed Dec. 14, 1942 6 Sheets-Sheet 1

INVENTOR.
ARTHUR H. JORDAN.
ATTORNEY.

Feb. 3, 1948.  A. H. JORDAN  2,435,281
CONTROL INSTRUMENT
Filed Dec. 14, 1942  6 Sheets-Sheet 3

INVENTOR.
ARTHUR H. JORDAN
BY
*C. B. Spangenberg*
ATTORNEY.

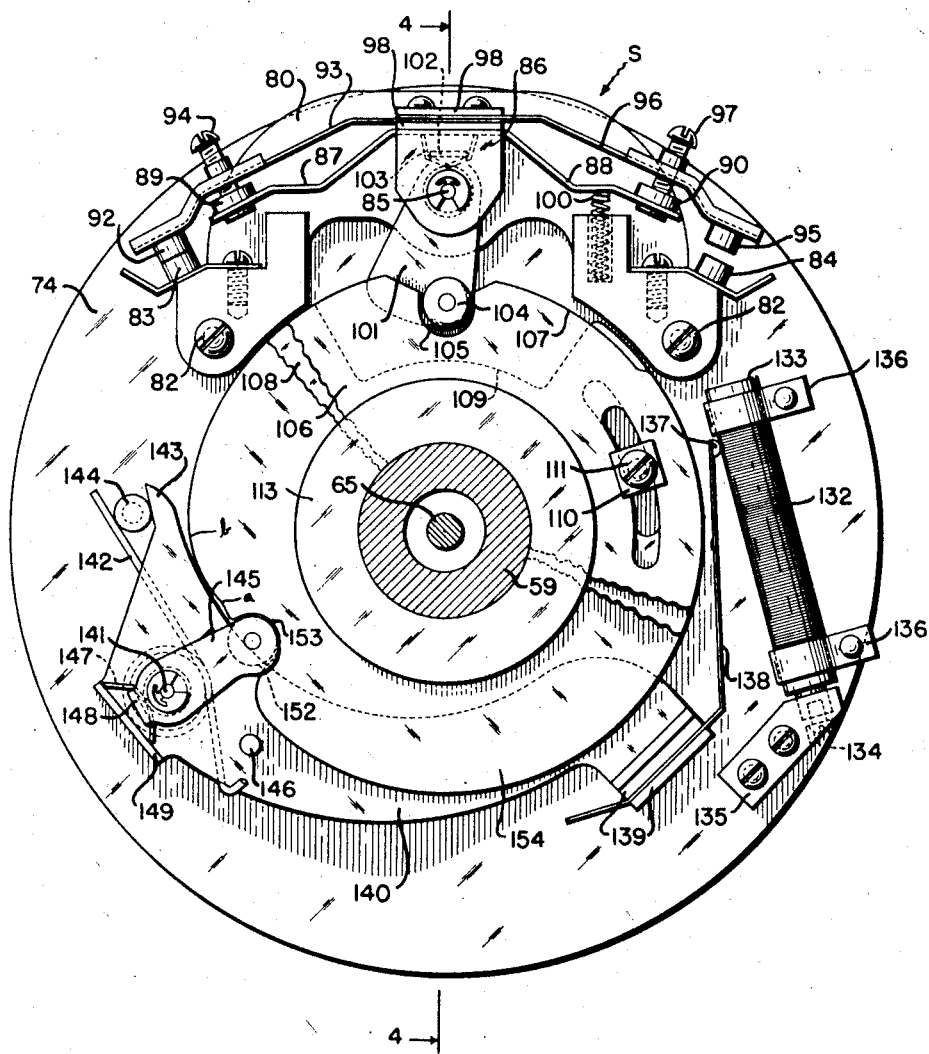

Feb. 3, 1948.  A. H. JORDAN  2,435,281
CONTROL INSTRUMENT
Filed Dec. 14, 1942  6 Sheets-Sheet 5
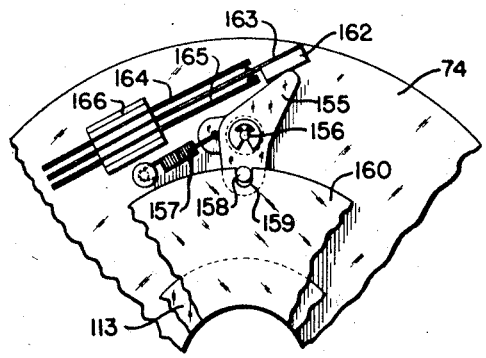
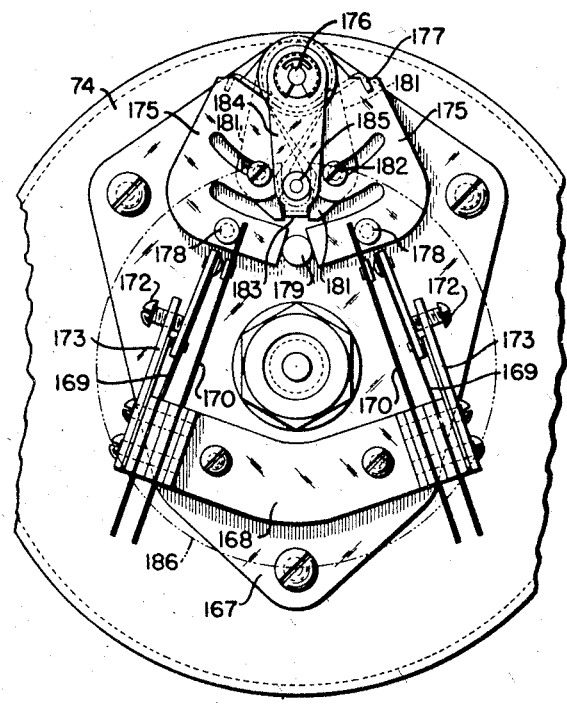
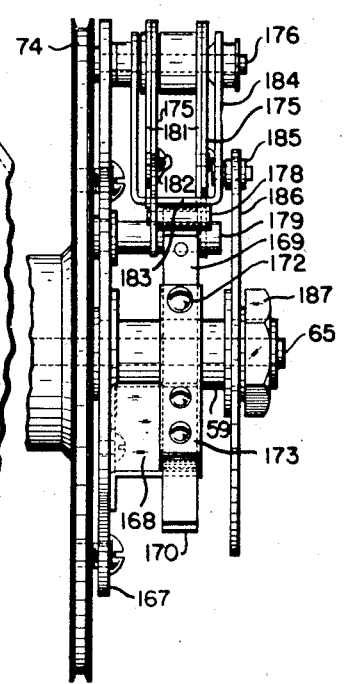
*INVENTOR.*
ARTHUR H. JORDAN
BY
*ATTORNEY.*

Feb. 3, 1948.    A. H. JORDAN    2,435,281
CONTROL INSTRUMENT
Filed Dec. 14, 1942    6 Sheets-Sheet 6
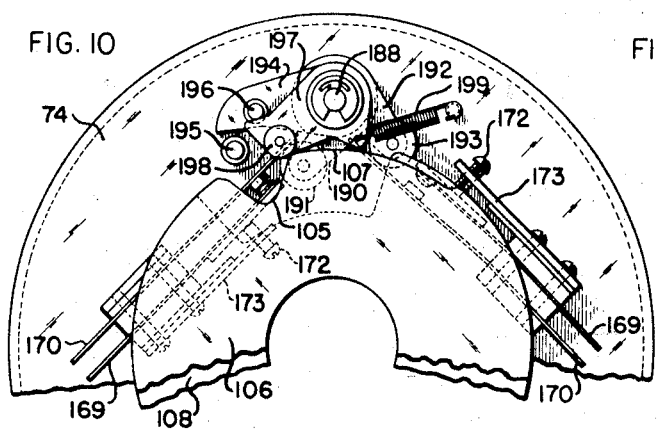
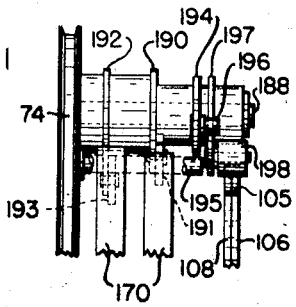
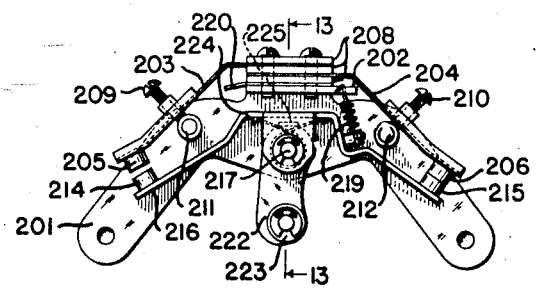
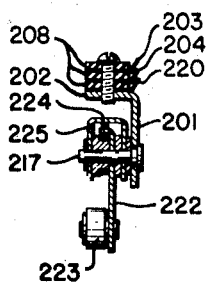
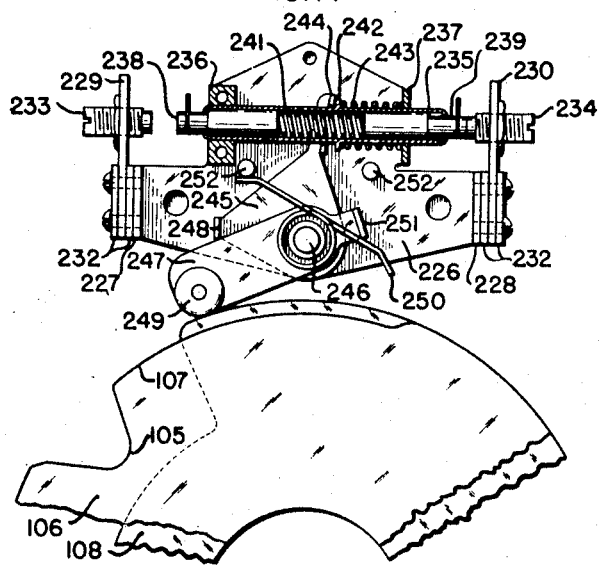
*INVENTOR.*
ARTHUR H. JORDAN
BY *C. B. Spangenberg*
ATTORNEY.

Patented Feb. 3, 1948

2,435,281

UNITED STATES PATENT OFFICE 2,435,281

CONTROL INSTRUMENT

Arthur H. Jordan, Norristown, Pa., assignor to The Brown Instrument Company, Philadelphia, Pa., a corporation of Pennsylvania Application December 14, 1942, Serial No. 468,925

21 Claims. (Cl. 200—56)

The present invention relates to control instruments and more particularly to control switches of the cam operated type which may be used with various types of measuring instruments that have a cam disc rotating to various positions depending upon the magnitude of the condition being measured, and means for operating these switches.

For purposes of illustration the switch and switch operating mechanism of my invention are being described herein as used in conjunction with a potentiometer type of instrument to operate a mechanism to control the magnitude of the temperature being measured. It will be readily apparent, however, that the switch mechanism could be used with other types of instruments for controlling other variable conditions.

The present switch comprises a plurality of contacts that are moved into or out of engagement with each other by means of a cam actuated lever. In each case the contacts of the switch may be so arranged that they may be either opened by the lever or may be closed by the lever. In some cases the switch is so formed that it has more than one pair of contacts; one of the pairs being closed or opened by a spring while another pair is opened or closed by the lever.

The switch and its actuating cam disc are each mounted for rotation around an axis. The cam disc is rotated to positions dependent upon the magnitude of the condition being measured, and is moved in one direction or an opposite direction with each change in the condition magnitude. The switch may be rotated around its axis to various positions depending upon the value at which it is desired to maintain the condition. In this manner the relative movements of the switch and cam disc may be used to open and/or close control circuits for any given magnitude of the condition that is being regulated.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 2:
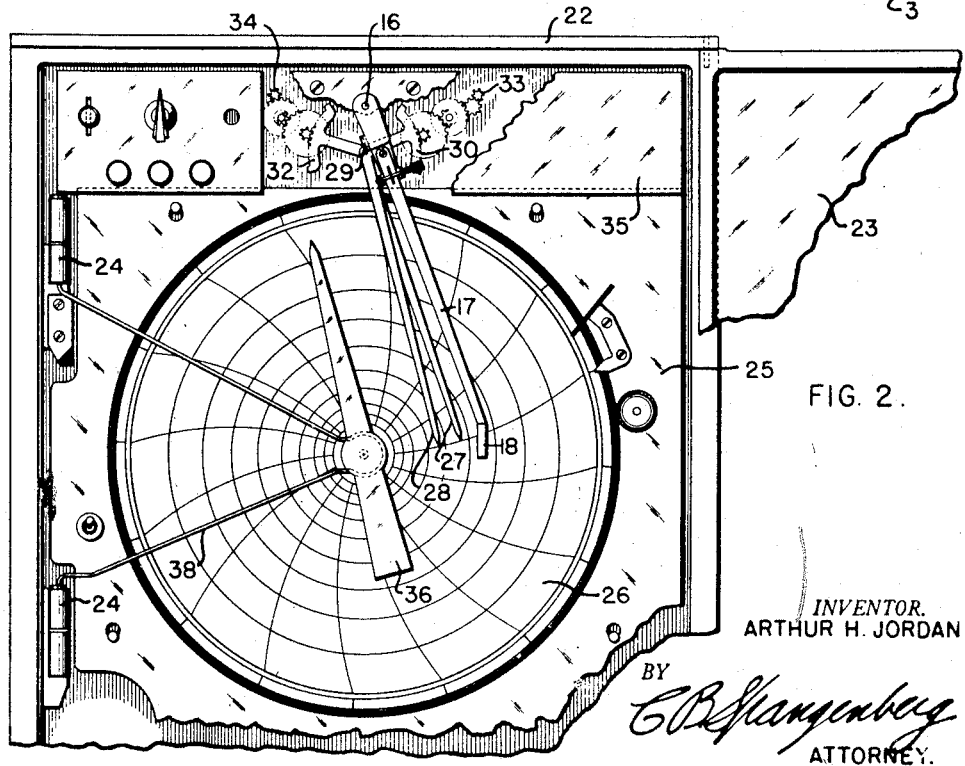
Figure 3:
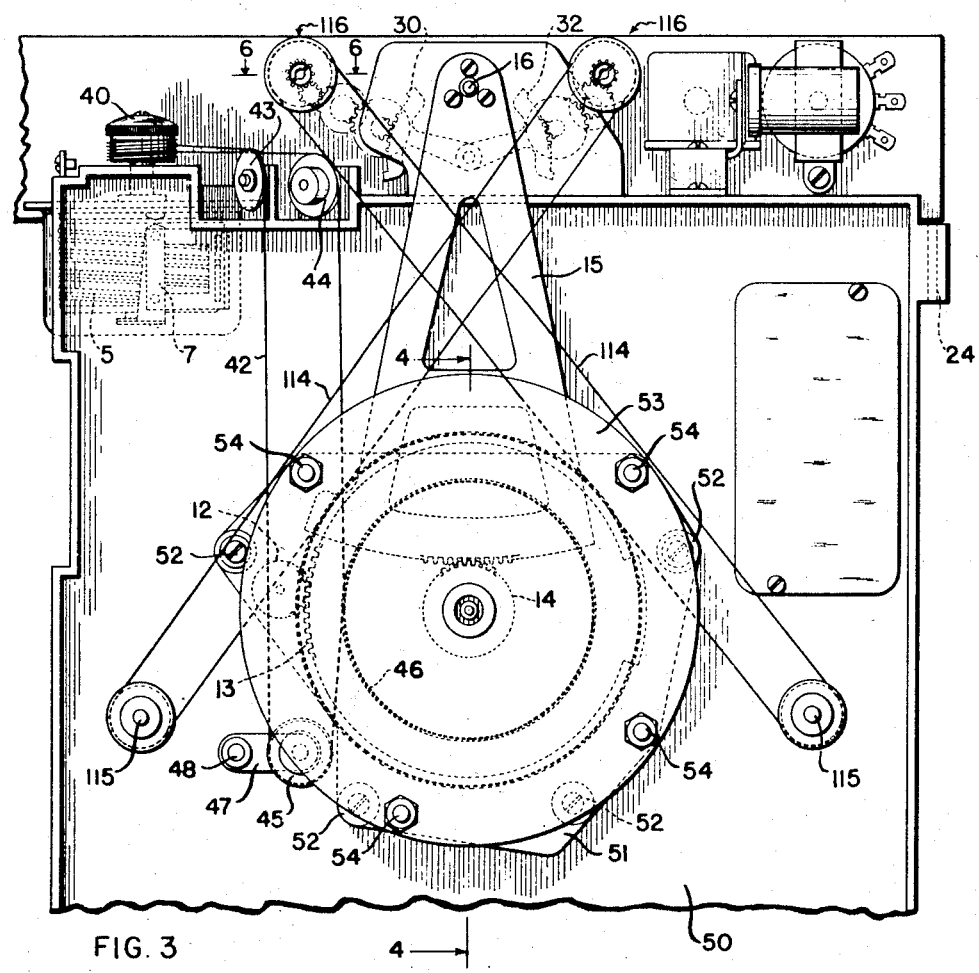
Figure 4:
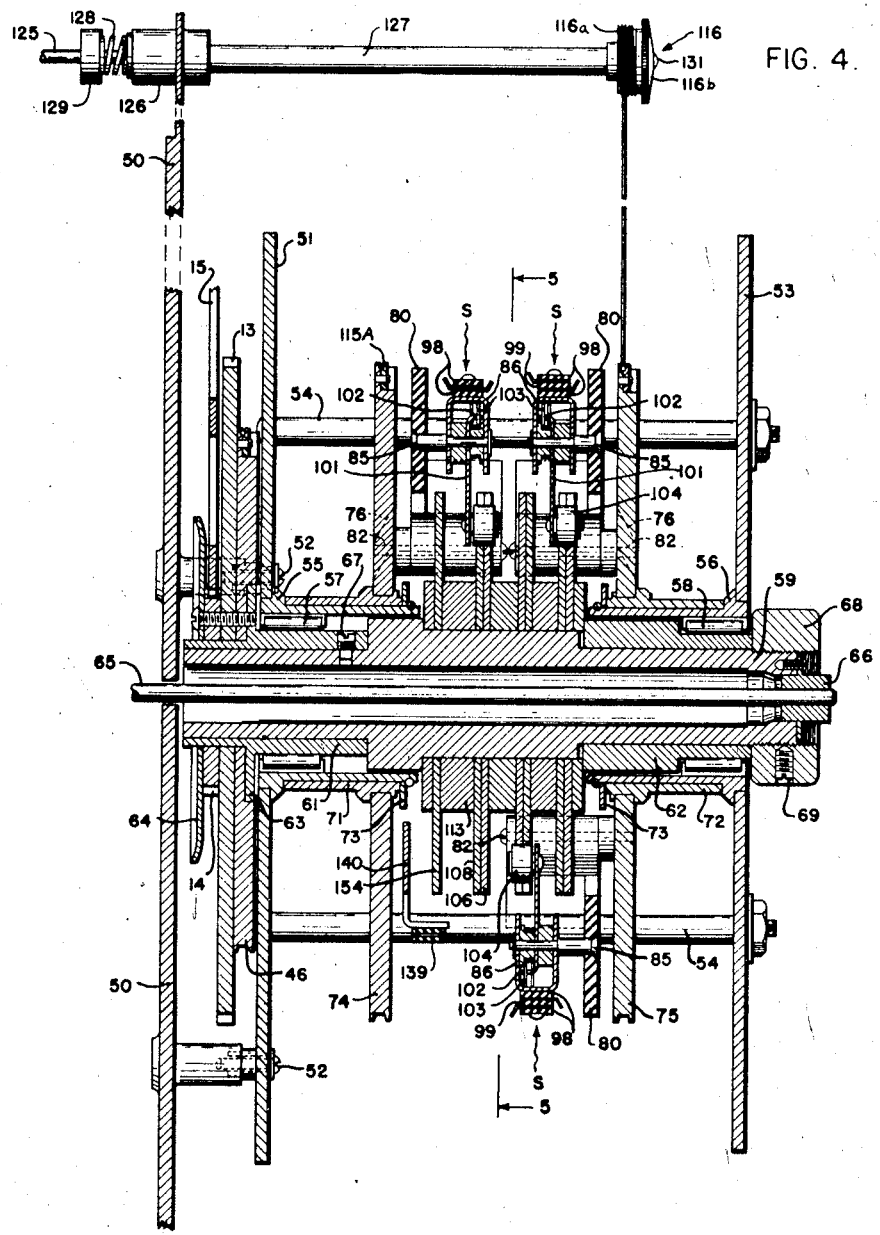

In the drawings:

Fig. 1 is a diagrammatic view of a potentiometer circuit and a control circuit used to measure and control the temperature of a furnace, Fig. 2 is a front view of the control instrument which is used, Fig. 3 is a rear view of the control mechanism supporting frame of the instrument, Fig. 4 is a view taken along lines 4—4 of Fig. 3, and of Fig. 5, Fig. 5 is a view taken along lines 5—5 of Fig. 4, Fig. 6 is a view taken along lines 6—6 of Fig. 3, Fig. 7 is a view of another type of switch, Figs. 8 and 9 are front and side views of another type switch, Figs. 10 and 11 are front and side views of still another type of switch, Fig. 12 is a view of another switch, Fig. 13 is a view taken on line 13—13 of Fig. 12, and Fig. 14 is a view partly in section of still another type of switch.

Referring first to Fig. 1, there is shown a furnace 1 that is supplied with fuel through a pipe 2. This pipe is provided with a motor operated valve 3, the motor of which can be driven in one direction or in an opposite direction to supply more or less fuel to the furnace. The temperature of the furnace is measured by a thermocouple 4 that is inserted through an opening in the wall therein, and which is connected in a potentiometer circuit of the type more fully described in the co-pending application of Walter P. Wills, Serial No. 421,173, filed on December 1, 1941, and which issued as Patent No. 2,423,540 on July 8, 1947.

As shown diagrammatically herein, the potentiometer circuit comprises a slide wire 5 which has an E. M. F. impressed across it by means of a battery 6. The voltage of the thermocouple 4 is opposed to the potential drop across a variable portion of the slidewire 5 as determined by the position of a contact 7 on the slidewire. Connected in series with the thermocouple and contact is a vibrator 8 and the primary winding of a transformer 9. The vibrator is adapted to open and close the thermocouple circuit and to apply on the primary winding a pulsating current which is in a direction and of a magnitude depending upon the extent of potentiometer unbalance. The secondary winding of transformer 9 is connected directly to an electronic amplifier 10, and the output of the amplifier is connected to one field winding of a two phase motor 11, the second field of which is connected directly to the line. Motor 11 will thus be energized for rotation in one direction or the other depending upon the phase of current in its amplifier energized winding, which is in turn dependent upon the direction of potentiometer unbalance. Motor 11 is connected to contact 7 to move the same along slidewire 5 in a direction to rebalance the potentiometer in response to an unbalance thereof.

The motor 11 in addition to driving the contactor 7, also serves to move the pen arm across a chart and to simultaneously rotate a control cam disc an amount proportional to the magnitude of the temperature in the furnace. As shown in Figure 1, the motor is provided with a pinion 12 that rotates a gear 13 to which is attached a control cam C. This gear also serves to rotate a smaller gear 14 that is in driving engagement with a segment member 15 to move this segment member around its axis 16. The segment member has movable with it a pen arm 17 which supports a pen 18 to move the same across a recording chart. Also rotatable around the axis upon which the gear 13 is mounted is a supporting member 74 upon which a control switch S for the motor of the valve 3 is mounted. Therefore, as the motor 11 is rotated, it not only adjusts the contact 7 along the slide wire 5 but it also moves a pen across a chart to make a record of the value of the temperature and simultaneously rotates a control cam to operate a switch S. This switch can close circuits for the motor of the valve to drive this motor in one direction or in an opposite direction to adjust the fuel so that the temperature of the furnace will be brought back to normal. The details of the manner in which the cam is operated and the switch is mounted and operated will be described below.

In Fig. 2 there is shown a front view of the potentiometer instrument which is used to measure the temperature of the furnace 1. This instrument is located in a suitable casing 22 that is provided with a door 23 which may be closed to protect the instrument. Within the instrument there is a pair of hinges 24 upon which a frame supporting the measuring and control mechanisms is mounted, and which frame may be swung around the hinges and out of the casing for adjustment and repair of the parts carried thereby. In front of the mechanisms and supported on the frame is a chart backing plate 25 in front of which the chart 26 is mounted. Also cooperating with the chart are a pair of indexes or pointers 27 and 28, the position of which above the chart corresponds to the value at which the temperature of the furnace 1 is to be maintained. It may well be that the instrument can alternately measure the temperature of more than one furnace and control the temperature of each of these furnaces at different values. For that reason a separate index would be necessary to indicate the temperature at which each furnace is to be maintained. Each of the indexes is pivoted around a point 29, and they are provided with segment members 30 and 32 respectively, whereby they may be adjusted by means of gear trains 33 and 34. Attached to the frame of the instrument is a plate 35 upon which the gear trains and the indexes are mounted. This plate has been broken away in Fig. 2 to indicate more clearly the manner in which the indexes are mounted and may be adjusted. The instrument is also provided with an indicating pointer 36 that is used to indicate the magnitude of the temperature and which cooperates with a scale that is preferably mounted upon the door 23 as more fully disclosed in the above mentioned Wills patent. The pointer is supported by means of a member 38 which is mounted in the hinges 24. In this fashion, the pointer may be moved with its support out of the way so that a new chart may be placed upon the instrument.

The slide wire 5 and the contact 7 above referred to, are located in the instrument framework, and the contact is preferably adjusted by means of a shaft that has a pulley 40 on its upper end in a manner set forth in the above mentioned Wills patent. Wrapped around the pulley is a cable 42 that passes over idler pulleys 43, 44 and 45, and that passes over a drive pulley 46 which is attached to the gear 13. The pulley 45 may be mounted on a lever 47 that is pivoted at 48, and which is biased downwardly to take up the slack in the cable. Rotation of the motor 11 will act through gear 13 and pulley 46 to drive the cable 42 and rotate pulley 40. In this manner, the contact 7 is positively driven along the slidewire 5 to a position in which the potentiometer circuit is balanced. This same rotation of the gear 13 is used to adjust the control instrumentalities of the instrument to control the temperature of the furnace 1 by adjusting the valve 3.

The swinging frame of the instrument supports on it all of the recording and control mechanism of the potentiometer. This frame includes a back member 50, as shown best in Fig. 4, which has attached in spaced relation to it a supporting plate 51 that is held in position by a number of studs 52. A second supporting plate 53 is held in spaced relation to the first supporting plate by means of spacing and supporting rods 54 so that the two plates and rods in effect form a cage that serves to support the pen driving and control mechanism. It is noted that the studs 52 are so placed that they will not interfere with the swinging movement of sector 15.

Fastened to the plate 51 is a tubular support 55, and fastened to the plate 53 is a tubular support 56, each of which has in it a roller bearing 57 and 58, respectively. Extending through the bearings is a sleeve 59 that has a journal 61 on its left end, and a journal 62 on its right end. This sleeve and its journals serve to support on them all of the rotating parts which drive the pen and pointer, and also to support the cams or discs which actuate the control switches. The journal 61 is reduced at its left end, and has a collar 63 formed approximately mid-way along its length. The reduced end of the journal receives the pulley 46, gears 13 and 14, and a dished disc 64 each of which are fastened in place to the collar 63 by means of screws, as shown. It is noted that the disc 64 along with the gear 13 forms a guideway for the sector member 15, which serves to drive the pen, to prevent this member from coming out of engagement with the gear 14. Rotation of the sleeve 59 also serves to rotate a pointer driving shaft 65 that is attached to the pointer 36. To this end, the shaft 65 is fastened at its right end to the sleeve 59 by means of a member 66. The latter member centers the shaft in the sleeve and is attached by suitable screws to both of the parts. Journal 61 is held in place on the sleeve 59 by means of a screw 67 extending through the sleeve, which screw has its lower end projecting into an opening in the sleeve. The journal 62 is adapted to be removed from the end of the sleeve 59 for a purpose to be later described, and is held in place on the sleeve by means of a cap 68 and a set screw 69 which extends through the cap and into the sleeve.

The supporting members 55 and 56 have mounted on them sleeves 71 and 72 respectively, each of which is held in place on its member by a retaining ring 73. The sleeves 71 and 72 each have rigidly attached to them a switch supporting disc 74 and 75, respectively. These discs serve to support the switches S which were mentioned above, and as shown herein, the disc 75 has two switches mounted on it, while the disc 74 has one switch and a proportioning control mechanism which will be described below. The switches shown in this figure are substantially similar, but each of them may take the form of any one of the switches which will be described below.

One form which the switch S may take is best shown in Figs. 4 and 5. As shown therein, the switch itself is mounted upon a support 80 which is made of insulating material and which is fastened to the disc 74 by means of screws 82. Each end of this support has a portion which projects upwardly out of the plane of the paper as shown in Figure 5 and each has mounted thereon a stationary contact 83 or 84. Projecting from the mid-point of the support 80 is a stud 85 that has mounted on it a yoke shaped member 86, which member has an arm 87 projecting from its left side and arm 88 projecting from its right side. Each of these projections is provided at its outer end with an abutment member 89 and 90 respectively, which is made of insulating material. Cooperating with the contact 83 is a second contact 92 that is mounted on a spring leaf 93, which leaf is attached to the yoke member 86. Extending through this leaf is an adjusting screw 94 which bears against the abutment 89 to adjust the initial position of contact 92 with respect to contact 83. In like manner, there is a contact 95 which cooperates with the contact 84. This contact is mounted on a spring leaf 96 that is provided with an adjusting screw 97. The spring leaves 93 and 96 are both mounted on the yoke member 86 and are separated from the yoke and from the screws which hold them in place by means of blocks 98. In the arrangement shown in Figure 5 the switch is of the type known as a single pole, double throw, but by separating the leaves 93 and 96 by another insulating block 99, such as is shown mounted on the plate 75 in Fig. 4, the switch can be made so that it is in effect two single pole, single throw switches. The yoke 86, and the parts carried thereby are normally biased in a counter-clockwise direction in Fig. 5 by means of a spring 100 in order to normally maintain contact 92 in engagement with contact 83, and to maintain contact 95 out of engagement with contact 84.

The yoke member is moved around the stud 85 in order to shift the position of the various contacts by means of an actuating arm 101 that is pivoted on the stud 85, and is received between the arms of the yoke 86 as best shown in Fig. 4. This arm has a bent over end 102, the opposite sides of which are engaged by spring 103 that encircles the shaft 85, and has its ends in engagement with the under side of the yoke. This arrangement normally tends to maintain the actuating arm in the position in which it is shown in Figure 5. A cam following roller 104 is pivoted on the outer end of the arm 101.

In order to move the actuating arm around its pivot and to actuate the switch, the roller 104 is received in a notch 105 formed in the periphery of a cam or disc 106 that is mounted on the sleeve 59. It should be noted that this cam is formed with a portion 107 of smaller radius than the majority of the cam, which portion extends to the right of the notch 105. The circumferential length of this portion 107 may, in effect, be varied by means of a cam 108 that is also mounted on the sleeve 59 and is adapted to cooperate with the cam 106. The cam 108 has a cut-out portion 109 which extends around the notch 105 so that cam 108 will not interfere with this notch. The cams 106 and 108 can be adjusted relative to each other, and maintained in their adjusted position by a clamp 110 and a screw 111 which are received in slots formed in the respective cams.

In the operation of the instrument, the disc 74 upon which the switch is mounted is held in some given position while the sleeve 59 upon which the cams are mounted is rotated to various positions depending upon the changes in temperature which are being measured. If, for example, the temperature changes in a direction to produce a clockwise rotation of the cams in Figure 5, the roller 104 will move up the left edge of notch 105 and will then bear upon the periphery of the cam. This motion will not have any effect upon the relative positions of the various switch contacts. If, however, the temperature should change in such a direction that the sleeve 59 carrying the cams is rotated in a counter-clockwise direction, the roller 104 will first move into the notch 105 to the position shown. Continued rotation of the cams would then bring the roller 104 to the surface 107 of the cam 106, and further rotation of the cams would bring the roller to the surface of the cam 108 which is the same diameter as the cam 106. As the roller 104 moves up on the surface 107 actuating arm 101 will be moved in a clockwise direction around the shaft 85 until its left edge engages the lower surface of arm 87 to move the yoke and the parts attached to it in a clockwise direction. The parts are so dimensioned with respect to each other, that when roller 104 is on the surface 107, the yoke 86 will be moved to such an extent that contacts 83 and 92 are separated, but contacts 95 and 84 are not brought into engagement with each other. Continued rotation of the cams to bring the roller 104 to the surface of the cam 108 will move the yoke 86 and parts attached thereto further in a clockwise direction to bring contact 95 into engagement with contact 84. Upon a reverse rotation of the cams 106 and 108, contacts 95 and 84 will first be separated and then contacts 92 and 83 will be brought into engagement. The screws 94 and 97 may be adjusted in such a fashion that proper spacing between the contacts 92 and 83, and 95 and 84 may be obtained. It is noted that the leaf springs 93 and 96 can bend so that the screws 94 and 97 can be separated from their abutment members 89 and 90 if the yoke 86 is moved sufficiently in either direction. The contacts of the switch can be connected in a conventional manner to the terminals of the motor of the valve 3 so that this valve will be driven in a direction to cut off the supply of fuel when the temperature of the furnace is above some normal value, and to open the valve to increase the supply of fuel when the temperature of the furnace falls below the normal value. By adjusting cam 108 relative to cam 106 the length of the surface 107 which is engaged by roller 104 can be varied. This adjusts the neutral distance of the controller, or the amount that the temperature of the furnace can vary without operating the valve motor 3.

As shown in Figure 4, the disc 74 has mounted on it one switch and one proportioning control mechanism, whereas the disc 75 has mounted upon it two switch mechanisms at diametrically opposite points on the disc. Each of the switches is actuated by a double cam mechanism of the type which has been described above, and the proportioning control mechanism is operated by a single cam 154 that is shaped as described below. Each of these cams is placed upon the sleeve 59, and is separated by members 113 of the proper width. The cams and their separators are held in place on the sleeve by means of the journal 62 and the cap 68. Screwing the cap tightly up on the sleeve 59 forces the left end of the journal against the outer spacer member 113 to hold all of these parts in position against a shoulder formed on the sleeve 59. It is noted that the switch which is attached to the upper part of disc 75 in Figure 4 is mounted on a comparatively short stud 85, and has its roller 104 extending to the right into the path of the cams that actuate this switch, whereas the switch on the lower half of the disc 75 is mounted on a comparatively long stud 85, and has its roller 104 extending to the left of the actuating arm so that this roller will be in the path of its actuating cam. In this fashion, the switches are so located that they do not interfere with each other or with the respective cams that are to actuate them.

In order to remove the switches for adjustment, and to permit removal of the cams so that they can also be adjusted, the cap 68 is first removed and then spacing bolts 54 are loosened so that the supporting plate 53 and disc 75 carried thereby and its switches may be removed. This leaves the cams easily accessible from the right end of the sleeve 59, and the journal 62 can be removed to give access to the cams and their spacers.

Each of the switches must necessarily have three or more wires leading from it to the control mechanism. These lead wires are attached to the switch terminals and extend between the insulating member 80 and disc 74 through an opening 76 in said disc to a space between the disc and support 51. The wires are preferably in cable form and are wrapped for a few turns in that space before they are led away. The turns of the cable permit rotation of the disc 74 without any strain on the wires.

As described, the switch will always be actuated when its cam has moved to a certain position depending upon the temperature being measured. In order to vary the point at which the switch is operated, the switch and its supporting disc may be rotated relative to the cam. This is possible since, for example, the disc 74 and the sleeve 71 can be moved around the outer surface of the sleeve 55. To accomplish this, the disc 74 is rotated by means of a cable 114 that passes around the periphery of this disc and over pulleys 115 and 116. The disc 74 has its periphery formed with a groove which can receive the cable and is provided with a clamp 115A to which the cable is attached. The cable and the disc are driven by means of the pulley 116, which forms part of the control point setting mechanism above mentioned and shown more clearly in Fig. 6. The first gear 33a of the control point setting gear train 33, which was mentioned above, is mounted on a shaft that is journaled in the plate 35, and which shaft has on its front end a knob 117 by means of which the gear may be manually rotated. The gear has formed on its right end a flange 118 that is fastened to a flexible steel disc 119 by means of diametrically disposed rivets 121. Disc 119 is also attached by means of rivets 122 that are disposed 90° away from the rivets 121 to a collar 123 that is fixed to the end of a shaft 125. Shaft 125 is slideably mounted in a bushing 126 that is received in an enlargement formed on plate 50 of the frame of the instrument. The right end of the shaft is surrounded by a spacing collar 127 which is disposed between the right end of bushing and a portion of 116a of a pulley 116. The entire assembly is biased toward the left by means of a spring 128 which is compressed between the left end of the bushing 126 and a collar 129 that is fast upon the shaft. The pulley 116 is formed of two parts; 116a which as mentioned above is attached to the shaft 125, and a portion 116b which is held in engagement with the part 116a and coaxial with the shaft 125 by means of a screw 131. One end of the cable 114 is attached to portion 116a of the pulley, while the other end is attached to the portion 116b. These portions can then be rotated relative to each other in order to take up the slack in the cable and are then fastened together and to the shaft 125 by screw 131.

In order to adjust the control point of the instrument or the point at which the switch will be operated, the knob 117 is rotated to rotate the shaft 125 and pulley 116. This acts through the cable 114 to rotate plate 74 and rotate the switch around its cam. Simultaneously the gearing 33 is used to move index 28 across the chart so that this index can give an indication of the point at which the switch will be operated. The plate 75 is rotated in exactly the same manner as the plate 74 in order to rotate the switches which are attached to that plate relative to their respective cams. The control point setting mechanism of the plate 75 differs from that of the control point setting mechanism of plate 74 only in the length of the shaft 125 and the spacing sleeve 127. The increased length of the shaft 125 and sleeve 127 is necessary in this case because plate 75 is further removed from frame member 50 than is plate 74. These parts are so arranged that one of the control point setting members is on one side of the center of the instrument, while the other control point setting member is on the opposite side of the center of the instrument as is best shown in Figs. 2 and 3. Inasmuch as the parts forming these control point setting members are duplicates, they have been given the same numbers on the drawing. It is noted that the friction obtained between sleeves 55 and 71 coupled with that produced between bearing 126 and sleeve 127 by spring 128 is usually sufficient to prevent accidental rotation of the disc 74 and therefore accidental displacement of the control point. If necessary, an additional restraining force may be obtained by a brake bearing against the surface of the discs 74 and 75.

At times it may be desirable to have a proportioning type of control such as is shown in Cunningham Patent 2,160,400, issued May 30, 1939, to adjust the valve 3, rather than the open contact type of control which has been described above. If such is the case, the control resistance of such a proportioning system may be mounted as shown at 132 on a core 133 that is attached by means of a screw 134 to a support 135 on the disc 74. This resistance has connected to its ends contacts 136 to which the lead wires from the resistance may be attached. The resistance is engaged by a movable contact 137 that is mounted on a spring supporting arm 138, which arm is insulated by means of blocks 139 from a supporting arm 140. In order to adjust the control system, the contact 137 is moved along the resistance 132, and to this end the arm 140 is pivoted for movement around a stud 141. The arm is normally biased in a counter-clockwise direction by means of a spring 142 to bring its end 143 into engagement with a stop pin 144, and may be moved in the opposite direction to shift the contact 137 along the resistance by means of engagement between a swinging arm 145 and a pin 146 that projects from the supporting arm 140. Arm 145 is maintained normally in the position shown in Fig. 5 by means of engagement between the ends of a spring 147 and a bent-over edge 148 on this arm. The springs also engage a bent-over portion 149 of the arm 140 to maintain the parts in their proper relation. Movement is imparted to the arm 145 by means of a roller 152 that is attached to its lower end. This roller is received by a cut-out portion 153 of a single cam 154 that is placed on the sleeve 59 and separated from cams 106 and 108 by means of a separator 113 as shown best in Fig. 4.

In the operation of the device any change in temperature in a direction that will produce a clock-wise rotation of the cam 154 will cause roller 152 to ride up the side of cut-out portion 153 to the surface of the cam. This will not have any control effect, since the arm 145 merely swings idly around its pivot. When, however, the temperature changes in a direction to produce a counter-clockwise rotation of the cam 154, the roller 152 will ride up the upper part of cut-out portion 153 onto an inclined surface of the cam. As the cam continues to rotate, the roller will gradually be moved further in a clockwise direction so that arm 145 will be brought into engagement with pin 146 to move supporting arm 140 around the pivot 141. This shifts contact 137 downwardly along resistance 132. As is shown in Fig. 5 of the drawing, cam 154 gradually increases in radius from point $a$ to point $b$ and is so dimensioned that when roller 152 makes contact with the point $a$, arm 145 will just engage the drive pin 146. This means that for a rotation of the cam 154, an amount equal to the angular distance between points $a$ and $b$, the contact 137 will be moved completely across the resistance 132. More or less rotation of the cam may be required to move the contact 137 through its full path depending upon the distance covered between the points $a$ and $b$ of the cam.

The instrument described was shown as having two switch supporting discs 74 and 75 with two control devices on each disc. It will be obvious, however, that one of the control discs may be omitted if desired or that a different number of control devices may be used on each disc from that described. The particular combination and number of control devices disclosed is by way of example only.

The above description shows how one type of open contact switch or a proportioning system may be operated from a potentiometer instrument in order to control the temperature which is being measured. Other types of switches may also be used and examples of these switches are described below. In each case the switch is mounted on a plate 74, similar to that above described and is operated by a cam which is mounted on the sleeve 59. Although the sleeve and cam may differ in size and shape from those above described, it will be evident that they have the same function and operate in the same manner as the sleeve and cams above described.

In Fig. 7 there is shown a switch mechanism which has a switch operating arm 155 that is moved around a pivot 156 in opposite directions against the tension of a spring 157 by means of the engagement between a pin 158 on the arm and a slot 159 in a cam 160. The outer end of the arm 155 acts against a block of insulating material 162 which is mounted on a contact carrying arm 163 to move this arm into engagement with a contact carrying spring member 164 or to permit the arm to move into engagement with a second contact carrying spring member 165. The arm 163 and the members 164 and 165 are suitably insulated from each other and mounted on the plate 74, as shown at 166 in the drawing.

In the operation of a switch of this type, when the cam 160 is rotated in a clockwise direction, the pin 158 will be moved by slot 159 around its pivot to swing the arm 155 counter-clockwise against the tension of spring 157. This moves the arm 163 upwardly to bring the contact of that arm into engagement with the contact of the member 164. Upon a counter-clockwise rotation of the cam 160 from the position shown the pin 158 will be moved to rotate arm 155 in a clockwise direction. The upper end of this arm will then recede from the block 162 to permit arm 163 to move its contact into engagement with the contact carried by member 165. In its mid-position, the contact on arm 163 may be in engagement with both of the contacts carried by members 164 and 165 or, if desired, may be out of engagement with each of the latter contacts. If this is true, it is merely necessary to bend the members 164 and 165 slightly away from the position in which they are shown. It is noted that spring 157 is moved off center and put under tension whenever the arm 155 is rotated. Because of this, the spring serves to keep the pin 158 in engagement with the periphery of cam 160 at all times, and therefore insures the return of the arm 155 to its neutral position when the cam 160 assumes the position shown.

In Figs. 8 and 9 there is shown a construction in which two switches are mounted on the plate 74 each switch being operated upon the rotation of the actuating cam in one direction. Attached to the plate 74 is a supporting plate 167 for the entire switch mechanism and this plate has fastened upon it a bracket 168, upon which the switch units themselves are mounted. Each switch consists of a stationary contact supporting leaf 169 and a spring leaf 170 that is biased toward the leaf 169 to keep the contacts in engagement with each other. Each leaf 169 may be adjusted to properly position it initially with respect to its leaf 170 by means of a screw 172 which is threaded into a screw supporting member 173. Each of the switch parts is separated by suitable insulating blocks and they are fastened together on the bracket 168, as best shown in Fig. 8 of the drawing.

The switches are normally maintained in an open position by means of a pair of arms 175 that are pivoted at 176 and biased toward a center position by means of a spring 177 to bring pins 178 on these arms to a position limited by engagement between the arms and a stop pin 179 which projects upwardly from the plate 167. The pins 178 engage spring leaves 170 to move these leaves toward the center position to separate the contacts. Arms 175 are moved away from their center position by means of engagement between members 181 that are adjustably fixed to arms 175 by screws 182 and the cross-piece 183 of a U-shaped actuating member 184. This actuating member is provided with a roller 185 that is received in a cut-out portion of a cam 186. The cam is mounted on sleeve 59 and held in its proper position on the sleeve by means of a knob 187.

In the operation of this switch, rotation of the cam will act through the roller 185 to move actuating member 184 around its pivot 176. If the cam, which is shown in dotted outline in Fig. 8 rotates in a counter-clockwise direction, the portion 183 of member 184 will engage the left hand member 181 to move its pin 178 to the left away from blade 170. The contacts of the left hand switch can then engage each other. In a like manner rotation of the cam 186 in a clockwise direction in Fig. 8 will move arm 184 counter-clockwise to act through the right hand members 181 and 175 to move pin 178 to the right away from its leaf 170. The contacts of the right-hand switch may then close. The adjustment between members 181 and arms 175 is provided to take up manufacturing tolerances and also to permit the arm 184 to have some free movement, if desired, during which neither of the switches will be operated. This adjustment gives, in effect, a dead neutral similar to that obtained by means of varying the extent of the surface 107 of cam 106. as described in connection with the switch of Fig. 5.

In Figures 10 and 11 there is shown a switch mechanism which is somewhat similar to that of Figure 8 except that in this case both of the switch units are operated by movement of the cam in one direction only. This switch includes switch units which are similar to those which were just described in connection with Figs. 8 and 9. and are therefore given the same reference characters in this figure. As shown herein, the switch units are mounted directly on the rotatable supporting plate 74, which also has projecting from it a stud 188. This stud has mounted for rotation on it, three members which are suitably fastened together so that they will move as a unit. The first is a switch actuating arm 190 which has a switch actuating roller 191 on its lower end to operate the left hand switch unit. The second member is a switch actuating arm 192 that has a roller 193 on its lower end which serves to operate the right hand switch unit. The third arm 194 serves as a stop to prevent a counter-clockwise rotation of the three members beyond a point which is determined by engagement between a surface formed on an outer end of this arm, and a stop pin 195 that projects from the plate 74. The three parts which are rotatable on the shaft 188, are biased for movement in a counter-clockwise direction by the weight of the various parts, and the force of the spring leaves 170 acting on them. These parts may be given an additional bias by any suitable means such as a spring, if it is necessary or desirable.

Arm 194 is moved in a clockwise or switch operating direction by means of engagement between a pin 196 projecting from this arm and a surface formed on the upper face of a cam operated lever 197. This latter lever has a cam following roller 198 on its end which is adapted to engage the periphery of the cams and is held in engagement therewith by means of the action of a spring 199. The cam which is shown as operating the switch in this figure is the same as the cam that is disclosed and described in connection with Fig. 5, and is given the same reference characters.

In the operation of this switch mechanism, a clockwise rotation of the cam from the position shown will swing the cam operated arm 197 counter-clockwise from the position shown into an inoperative position. Upon rotation of the cam in a counter-clockwise direction, the arm 197 will be moved from its inoperative position to a position in which roller 198 is received in depression 105. Continued rotation of the cam will then bring the roller 198 to the position shown upon the surface 107 wherein the switch actuating arm 197 has been moved to a position in which the right hand switch unit is opened while the left hand switch unit is still closed. Continued rotation of the cams will bring the surface of cam 108 under roller 198 to move the switch actuating members further in a clockwise direction so that roller 191 will open the left hand switch unit.

The switch unit which is disclosed in Fig. 12 consists of a support 201 which may or may not be made of insulating material and which is adapted to be fastened directly to the rotatable switch supporting plate 74. This support 201 is provided at its upper edge with a bent-over portion 202 that supports thereon a spring leaf 203 projecting to the left and a spring leaf 204 projecting to the right. These spring leaves carry contacts 205 and 206 respectively, and are separated from each other and from the portion 202 by means of insulating blocks 208. Each of the spring leaves and the contacts carried thereby is biased toward the center of the switch support for an amount that is limited by engagement between screws 209 and 210, and insulating blocks 211 and 212 respectively that project forwardly from the support 201. Adjustment of these screws can predetermine the normal position of the contacts 205 and 206 very accurately.

The stationary contacts 205 and 206 are adapted to be engaged by movable contacts 214 and 215 respectively. Each of the movable contacts is attached to a rocking support 216 which is pivoted on stud 217 and which is biased in a counter-clockwise direction by means of a spring 219 to maintain normally contacts 206 and 215 in engagement with each other. It is noted that the contacts 214 and 215 are electrically connected by means of the plate 216, and are also connected to a terminal 220 that is mounted below the insulating blocks 208 and against the edge 202. If the support 201 is made of some insulating material, the spring 219 will serve to connect the contacts electrically to the terminal 220. If, however, the support 201 is itself an electrical conductor, the connection between the contacts and terminal 220 is through the plate. The movable switch contacts are operated by engagement between the left edge of an actuating lever 222 that is also pivoted on the stud 217, and the lower surface of the left hand side of the member 216. The actuating lever 222 is maintained normally in the position shown by means of a spring 224 whose opposite ends are wrapped around the stud 217 and engage both the lower surface of member 216 and a bent-over tongue 225 on the upper portion of the actuating arm 222.

The cam which operates this switch may be of the type described in connection with Figs. 5 and 10 in which there is provided a neutral zone that will permit opening of contacts 206 and 215 prior to the time that contacts 205 and 214 are brought into engagement, or may be of the type shown in Fig. 8 in which there is no neutral zone. In the latter case, as the roller 223 engages in the depression of the cam, it will be moved so that one pair of contacts is opened, and the other closed. By proper adjustment of the contacts 205 and 206, the switch may be arranged so that contact 214 will be brought into engagement with contact 205, before contact 215 is moved out of engagement with contact 206.

Each of the switch mechanisms that have been described above have employed the use of swinging contacts in cooperation with stationary contacts, or have employed the use of the conventional telephone type switch in which the contacts have a swinging motion. In some cases, however, it may be desirable to use a switch unit in which the movable contact has a straight rather than a rotary motion. Such a switch is disclosed in Fig. 14. In that switch, there is provided a support 226 which is attached to the plate 74. This support has its ends bent upwardly perpendicular to the plane of the paper as shown at 227 and 228, which ends have mounted thereon supports 229 and 230. These supports are insulated from the main support 226 by insulating blocks 232 and they serve to hold stationary contacts 233 and 234 respectively in some given position. As shown, the contacts are in the form of screw members that can be adjusted in their supports, and locked in position by lock nuts.

The movable contacts are supported by a tubular member 235 that is slidably received in openings of edges 236 and 237 that may either be attached to or formed as a part of the support 226. As shown, the edge 236 is thicker than the edge 237 since it may well be used as a terminal for a lead to the movable contacts. The ends of the tubular member 235 are bent inwardly to engage shoulders formed on movable contacts 238 and 239 that are slidably mounted in this sleeve and are each biased outwardly away from each other by a spring 241. This tube has a collar 242 formed on it, and is encircled by a spring 243, one end of which engages the edge 237 and the other the collar 242 to normally bias the tube and the contacts carried thereby to the left so that contact 238 will be in engagement with contact 233. Tube 235 is moved to the right to bring contacts 239 and 234 into engagement by means of a pair of fingers 244 that engage the left side of the collar 242, which fingers are formed on an arm 245 that is pivoted to rotate around a stud 246. The spring 243 serves to bias the arm 245 in a counter-clockwise direction, but the arm may be moved in a clockwise direction by engagement between an actuating lever 247 that is also pivoted on stud 246 and a projection 248 of the arm. The actuating lever 247 has a cam following roller 249 on its lower end, and is normally biased to a vertical position by means of engagement between the ends of a spring 250 which is wrapped around the stud 246, and the sides of a tongue 251 which is formed on the upper end of the arm 247. The outer ends of the spring are limited in their movement by engagement with stop pins 252.

This switch unit may be operated by a cam similar to that disclosed in Figs. 5 and 10 and the operation should be apparent from the above description. It will be noted that as the operating cam rotates in a counter-clockwise direction, the actuating lever 247 will be moved to the position shown to bring contact 239 into engagement with contact 234. Upon a clockwise rotation of the cam, the actuating lever 247 will first move to permit opening of the contacts 239 and 234, and then closing of contacts 238 and 233. Continued rotation of the cam will swing the actuating lever 247 in a counter-clockwise direction around the shaft 246 to an idling position without further effect on the switch contact. Any over travel of the tube 235 after contact 239 engages contact 234 or contact 238 engages contact 233 will be absorbed by sliding movement of the movable contact in the tube against the bias of spring 241. This is shown by the position of contact 239 in the figure.

From the above description, it will be seen that I have provided a novel and highly efficient switch control mechanism that may be used in conjunction with any type of measuring apparatus that has sufficient power to rotate the switch actuating cams. It will also be seen that I have provided a novel switch actuating mechanism which forms a part of the control mechanism and have also developed several types of switches that may efficiently be used with the mechanism. The combination herein disclosed is easy to assemble and operate, and produces a very accurate control.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention what I claim as new and desire to secure by Letters Patent is:

1. In a control instrument, the combination of a pair of coaxially rotatable members, means to rotate one of said members to various predetermined positions, second means to rotate the other of said members to various positions relative to the position of said first member, control means carried by said one of said members, and a part pivoted to said one of said members and adapted to operate said control means, portions of said part and said other member cooperating to move said part to operate said control means.

2. In a control instrument, a pair of relatively movable control members one of which is stationary and the other of which is movable, a rotatable support upon which said members are mounted, means to rotate said support to various predetermined positions, means to maintain said control members in a given normal position on said support, a control member actuating part pivoted to said support, a rotatable element mounted to rotate coaxially with said support, and means to rotate said element to various positions relative to said support, said element and said actuating part being formed with cooperating portions so that rotation of said element will move said actuating part to shift said control members relative to each other.

3. In a control instrument, the combination of a frame, a pair of spaced supports carried by said frame, each support having a hollow sleeve attached thereto, a switch supporting member mounted for rotation on each sleeve, a switch and a switch actuating lever carried by each switch supporting member, a part mounted for rotation in said sleeves, a plurality of disc shaped elements each having a depression in its periphery carried by said part, one element for each switch, the sides of said depressions and the periphery of said elements each cooperating with a switch actuating lever to move the same as said elements rotate, and means to rotate said part and the elements carried thereby to various positions.

4. The combination of claim 3 including means to individually adjust said switch supporting members on their sleeves whereby the depressions in said disc shaped elements will engage the switch actuating levers at different points in their rotation.

5. In a control instrument, the combination of an instrument frame, a cage member including a sleeve, a switch support rotatable on said sleeve, a switch including a stationary contact and a movable contact adapted to cooperate with said stationary contact mounted on said support, a switch actuating mechanism including means to move said movable contact pivoted to said support and an operating means, means to rotate said support around said sleeve to various predetermined positions, a part mounted for rotation in said sleeve, a disc shaped switch operating member fastened to said part, said member having a depression in its periphery to cooperate with said operating means to actuate said mechanism as said disc shaped member rotates, and means to rotate said part to various positions relative to said support.

6. In a control instrument, the combination of a disc like member having a depression in its periphery, means to rotate said member to various positions, a support mounted in a position coaxial with said member, means to rotate said support to various positions, a switch mechanism mounted on said support and insulated therefrom, and a switch actuating lever also pivoted to said support and adapted upon movement around its pivot to operate said switch, said lever including a part cooperating with the depression in said member to be engaged and moved by the sides of said depression as said member rotates whereby said switch actuating lever will operate said switch.

7. In a control instrument, the combination of a support movable to various positions, a switch mechanism mounted on said support and insulated therefrom, a switch actuating lever also pivoted to said support and adapted upon movement around its pivot in one direction to actuate said switch, a member having a portion thereof cooperating with said lever to move the same in its switch actuating direction and in the opposite direction, and means to move said member to various positions.

8. In a control instrument, the combination of a disc having a depression formed in its periphery, means to rotate said disc to various positions, a support, a switch mechanism mounted on said support, a pivoted switch operating lever also mounted on said support and having a roller adapted to be received by said depression in one position of the disc, and means to bias said lever toward a position in which said roller is in said depression, the relation of the parts being such that rotation of said disc in one direction from said position moves said lever to an inoperative position and rotation of said disc in the opposite direction from said position moves said lever to a switch actuating position.

9. In a control instrument, the combination of a switch support, a switch mechanism mounted on said support and insulated therefrom and comprising a movable contact and a stationary contact, a switch actuating lever also pivoted to said support and movable from an inoperative position to an operative position in which said movable contact is moved thereby relative to said stationary contact, means to bias normally said switch actuating lever to a position intermediate said operative and inoperative positions, a control disc having a depression in its periphery to receive said switch actuating lever when it is in its intermediate position, and means to rotate said control disc to move said switch actuating lever into its operative or its inoperative position.

10. In a control instrument, the combination of a rotatable switch support, a switch mechanism mounted on said support and insulated therefrom and including a pair of contacts, means to adjustably mount one of said contacts on said support, means to pivotally mount the other of said contacts on said support, an actuating lever also pivoted on said support coaxially with said pivotally mounting means, means to normally hold said contacts in one position relative to each other, said actuating lever being operable to move said contacts to another position relative to each other, a cam rotatable to various positions, and cooperating means between said cam and said actuating lever to move the same and shift the relative positions of said contacts.

11. In a control instrument, the combination of a disc shaped member having a depression formed in its periphery, means to rotate said member to various positions, a control switch support mounted to rotate around an axis coaxial with that of said member, a switch mechanism mounted on and insulated from said support including a contact fixed with respect to said support, and a contact movable relative to said support into and out of engagement with said fixed contact, and a switch operating mechanism also pivoted on said support and including a first portion to move said movable contact and a second portion cooperating with the depression in said disc shaped member to be moved by the latter as it rotates.

12. A control switch comprising a support, a pair of stationary contacts mounted on said support, a movable member, a pair of contacts mounted on said member, each of the contacts on said member adapted to engage one of said stationary contacts, means to maintain normally one of said movable contacts in engagement with one of said stationary contacts, a pivoted lever having a portion adapted to engage said member, and means to move said lever into engagement with said member and thereafter to move said member to bring the other movable contact into engagement with the other stationary contact and separate said contacts that are normally maintained in engagement.

13. A control switch comprising a first and a second stationary contact, means to mount said contacts in positions spaced apart from each other, a movable support, a first and a second movable contact mounted on said support and adapted to engage said first and second stationary contacts respectively, resilient means normally operative to move said support to a position in which said first stationary contact is engaged by said first movable contact, means to move said support to a position to bring said second movable contact into engagement with said second stationary contact comprising a pivoted lever adapted to engage a portion of said support to move the same, means to move said lever against said support, and means to normally bias said lever out of engagement with said support.

14. A control switch comprising a pair of separated stationary contacts, a pivoted support located between said contacts, a second pair of contacts mounted on said support and adapted to engage said stationary contacts respectively, means to bias said support in a direction to bring one of each pair of contacts into engagement with each other, means to overcome said bias and bring the other contacts of each of said pairs of contacts into engagement with each other comprising a lever pivoted coaxially with said support, means to normally bias said lever out of engagement with said support and means to operate said lever.

15. A control switch including a support, a pair of stationary contacts attached to said support, a member pivoted to said support and having a pair of projecting arms, a pair of resilient elements each supporting a contact that is adapted to engage one of said first mentioned contacts attached to said member and overlying said arms, means on said resilient elements and cooperating with said arms to adjust them relative to said arms and thereby properly locate the contacts carried by said resilient elements relative to said arms, an actuating lever pivoted coaxially with said member, means to bias said member around its pivot in a direction to bring one of the contacts carried thereby into engagement with one of said stationary contacts, and means operative to move said actuating lever into engagement with said member and move it against its bias to bring the other contact carried thereby into engagement with the other stationary contact.

16. A control switch including a support, a first resilient element carrying a contact, a second resilient element carrying a contact, means to mount said elements on said support with the elements extending in opposite directions, an abutment on said support underlying each of said elements, means mounted on each of said elements and cooperating with said supports to adjust said elements and thereby the contacts carried thereby to given position, a member pivoted to said support and carrying a contact to engage each of the contacts carried by said first and second elements, means to bias said member around its pivot to bring one of the contacts carried thereby into engagement with a contact carried by one of said resilient elements, and means to move said member against its bias to bring the other contact carried thereby into engagement with the contact carried by the other of said resilient elements.

17. A control switch comprising a support, a pair of spaced contacts carried by said support, a guideway, a tubular member having constricted ends slidable in said guideway, a pair of contacts received by said tubular member and projecting through said restricted ends, means to force said contacts apart and toward said ends, said tubular member being slidable in said guideway to bring the contacts carried thereby into engagement with one or the other of said spaced contacts respectively, means to bias normally said tubular member in a direction to bring one of the contacts carried thereby into engagement with one of said stationary contacts, a pivoted actuating member having a portion thereof cooperating with said tubular member, and means to at times move said actuating member to shift said tubular member against its bias and bring the second contact carried thereby into engagement with the other of said spaced contacts.

18. In an instrument comprising a casing having a manually operable device provided in a readily accessible location at the front thereof, control mechanism disposed within said casing comprising a pair of coaxially rotatable members, exhibiting means, an operative connection between said manually operable device, one of said members and said exhibiting means whereby said one member may be rotated to various predetermined positions and said exhibiting means adjusted to exhibit the position of said one member by manipulation of said manually operable device, a control device to rotate the other of said members to various predetermined positions relative to the position of said one member, control means carried by said one of said members, and a part pivoted to said one of said members and adapted to operate said control means, portions of said part and said other member cooperating to move said part to operate said control means.

19. In an instrument comprising a casing having a manually operable device provided in a readily accessible location at the front thereof, control mechanism disposed within said casing comprising a pair of relatively movable control members one of which is stationary and the other of which is movable, a rotatable support upon which said members are mounted, exhibiting means, an operative connection between said manually operable device, said support, and said exhibiting means whereby said support may be rotated to various predetermined positions and said exhibiting means adjusted to exhibit the position of said support by manipulation of said manually operable device, means to maintain said control members in a given normal position on said support, a control member actuating part pivoted to said support, a rotatable element mounted to rotate coaxially with said support, and a control device to rotate said element to various positions relative to said support, said element and said actuating part being formed with cooperating portions so that rotation of said element will move said actuating part to shift said control members relative to each other.

20. In an instrument comprising a casing having a manually operable device provided in a readily accessible location at the front thereof, control mechanism disposed within said casing comprising a frame, a hollow sleeve mounted for rotation on said frame, a rotatable switch supporting member rigidly carried by said sleeve, a switch and a switch actuating lever carried by said switch supporting member, exhibiting means, an operative connection between said manually operable device, said sleeve and said exhibiting means whereby said switch supporting member may be rotated to various predetermined positions and said exhibiting means adjusted to exhibit the position of said switch supporting member by manipulation of said manually operable device, a part mounted for rotation in said sleeve, a shaped cam element carried by said part, the cam surface of said element being arranged in cooperative relation with said switch actuating lever to move said lever as said element is rotated, and a control device to rotate said part and thereby said element.

21. In an instrument comprising a casing having a manually operable device provided in a readily accessible location at the front thereof, control mechanism disposed within said casing comprising a frame, hollow sleeve means mounted for rotation on said frame, rotatable switch supporting means rigidly carried by said sleeve means, a plurality of switches carried by said switch supporting means, a switch actuating lever individually associated with each of said switches, all of said switch actuating levers being carried by said switch supporting means, exhibiting means, an operative connection between said manually operable device, said sleeve means and said exhibiting means whereby said switch supporting means may be rotated to various predetermined positions and said exhibiting means adjusted to exhibit the position of said switch supporting means by manipulation of said manually operable device, a part mounted for rotation in said sleeve, rotatable cam means carried by said part, the cam surface of said cam means being arranged in cooperative relation with said switch actuating levers to move said levers as said cam means is rotated, and a control device to rotate said part and thereby said cam means.

ARTHUR H. JORDAN.

REFERENCES CITED

The following references are of record in the file of this patent:

UNITED STATES PATENTS

| Number | Name | Date |
| --- | --- | --- |
| 2,288,300 | Ray | June 30, 1942 |
| 2,302,626 | Gallagher | Nov. 17, 1942 |
| 2,261,087 | Jones | Oct. 28, 1941 |
| 1,560,810 | Stone | Nov. 10, 1925 |
| 2,139,908 | Osborn | Dec. 13, 1938 |